United States Patent Office 3,519,594
Patented July 7, 1970

3,519,594
COATED ASBESTOS AND METHOD OF MAKING AND USING SAME
Alan Sherman Michaels, Lexington, Mass., assignor to Amicon Corporation, Lexington, Mass., a corporation of Massachusetts
No Drawing. Filed Nov. 9, 1967, Ser. No. 681,933
Int. Cl. C08f 1/84
U.S. Cl. 260—41                                            9 Claims

ABSTRACT OF THE DISCLOSURE

Basic fibrous and particulate fillers, having isoelectric points above about 8, e.g. chrysotile asbestos, are well dispersed in an aqueous medium in which is dissolved a barium, strontium, or calcium compound, and a water-soluble per-compound initiator of polymerization; a water-insoluble ethylenically unsaturated monomer dispersed in the medium is polymerized to form a polymer coating on the filler. The coated filler is used as a filler by dispersing it in a mass of organic polymeric material such as polypropylene.

---

This invention relates to a method of preparing basic filler particles adapted for use in synthetic organic polymeric compositions, particularly polypropylene compositions, and pertains more specifically to a process for defibrillating asbestos particles and applying thereto an adherent coating of polymer made from ethylenically unsaturated monomer and to the particles so coated and the use of the same.

Asbestos is widely available and has certain desirable physical properties which make its use as a filler in synthetic organic polymer compositions, particularly thermoplastic compositions, advantageous. However, in order to achieve maximum effectiveness of the asbestos in improving the properties of such compositions, it must be in the form of primary fibrils, a form very difficult to achieve by conventional techniques except to a relatively minor extent; in addition, in the case of certain synthetic thermoplastic compositions, particularly polypropylene compositions, direct dispersion of asbestos in the plastic when the latter is in the molten form not only is exceedingly difficult but the plastic composition so prepared tends to exhibit cracking and degradation of the polymer.

The present invention provides a method for defibrillating asbestos to provide a large proportion of primary fibrils and also for coating the asbestos fibrils with a layer of polymer formed in situ on the surface of the fibrils which facilitates dispersion of the coated fibrils in synthetic plastic compositions and which also reduces the tendency of such synthetic plastic compositions as polypropylene compositions to crack or degrade after the asbestos has been mixed therewith. The method comprises forming a mixture of asbestos with water at a pH of approximately 4 to 5, dissolving in the aqueous mixture compounds of certain polyvalent metals to form a dispersion of primary fibrils having an activated surface, and mixing with the dispersion a water-soluble initiator of polymerization and dispersing in the aqueous medium a water insoluble ethylenically unsaturated monomer and polymerizing to form a coating of polymer in situ on the surface of the asbestos particles. The coated particles may then be separated from the aqueous dispersion in any conventional manner and the dried coated particles may be dispersed or blended in the desired synthetic polymeric composition in the same manner as any other filler, or the synthetic polymeric composition may be dispersed in the aqueous dispersion of coated particles whereupon both the plastic and the particles may be coagulated together from the dispersion and dried.

While there may be employed a variety of different kinds of cationic fillers, i.e. basic materials with an isoelectric point above pH of about 8, such as wollastonite, talc, calcium carbonate and chrysotile asbestos, the latter is preferred, particularly the variety known as Coalinga asbestos. The proportion of asbestos to water in the dispersion should be kept below about 10% by weight, best results being obtained when the asbestos amounts to about 1 to 3% by weight of the water. While lower concentrations can be used, it is generally uneconomic to employ less than about 0.5% by weight.

The pH of the mixture of filler and water must be adjusted to well below the isoelectric point, preferably about 4 to 5 pH units from the pH obtained simply by mixing the asbestos with the water. This latter pH is generally above 7. The adjustment in pH may be accomplished by means of any suitable monobasic acid which is a strong enough acid to produce the desired pH; for example there may be used hydrochloric acid, acrylic acid, acetic acid, and the like.

To the mixture of filler and water prepared as described above there can also be added one or more water soluble compounds of certain polyvalent metal ions such as barium, strontium, or calcium, but most advantageously barium. These may be added as water-soluble compounds of monovalent anions such as acetate, chloride nitrate, oxalate or hydroxide. While not essential to the processes described below, it has been found that in certain cases, particularly where the filler is chrysotile asbestos, the addition of a compound such as barium hydroxide can improve the degree of defibrillation and dispersion which is achievable after the suspension is brought to a pH below the isoelectric point by the addition of a suitable amount of monobasic acid. At such a point in the process where the pH is below the isoelectric point the particles are positively charged and are well dispersed in water by virtue of the forces of mutual repulsion between the cationic particles.

The amount of water soluble polyvalent metal compound may vary from about 0.1 to about 10% by weight of the filler, the amount which may be effectively used depending upon the total surface area of the filler particles present. In the case of barium compounds used with Coalinga asbestos; for example, the optimum quantity of the compound is the amount equivalent to 1% by weight of barium hydroxide based on the weight of the asbestos.

There is then polymerized in the aqueous dispersion of the dispersed filler particles prepared as described above a polymerizable monomeric material containing at least one ethylenic unsaturation. The polymerization is preferably carried out by first dissolving in the dispersion a water-soluble initiator of polymerization which has specific affinity for the cationic filler particles. For example, in the case of dispersions of positively charged chrysotile asbestos particles there is employed a water-soluble persulfate initiator of polymerization such as ammonium persulfate, potassium persulfate, sodium persulfate, etc., which is sorbed by the cationic asbestos particles. Although the introduction of such an initiator into the aqueous dispersion generally causes flocculation of the dispersed asbestos particles, a water insoluble monomer containing at least one ethylenic unsaturation may then be added to the flocculated dispersion, whereupon polymerization occurs on the surface of the particles when the dispersion is heated at a moderate temperature, e.g. 40°–80° C.

The amount of initiator added may vary over a considerable range. In general, it may be from 0.5 to 5 percent by weight of the monomers used, although from 1 to 3 percent by weight is preferred. The relative proportion of filler and water in the polymerizing system may also vary widely; chrysotile asbestos may be dispersed in amounts to 0.5 to 10 percent by weight of the water, preferably, 1 to 3 percent. Other fillers such as talc and wollastonite are dispersable up to about 50% by weight of water.

The monomeric material polymerized on the filler particles may be a single compound containing either a single ethylenic unsaturation or containing two or more such ethylenically unsaturated compounds which may be polymerized either simultaneously or successively. The compound or compounds containing at least one ethylenic unsaturation need not be monomeric in nature but may be low molecular weight polymers or oligomers, having a molecular weight up to about five thousand, which contain residual ethylenic unsaturation susceptible to further polymerization. In any event the polymerizable material whether monomeric or not, should be substantially water insoluble. The term "substantially water insoluble" is defined for the purpose of this invention to mean having water solubility below about 10% by weight at 25° C.; advantageously this solubility should be below 5% by weight.

Among the polymerizable compounds containing at least one ethylenic unsaturation which may be employed in the present invention as the following: ethyl acrylate, butyl acrylate, butyl methacrylate, 2-ethylhexyl acrylate, lauryl methacrylate, styrene, vinyl esters of carboxylic acids, 2-vinyl pyridine, 4-vinyl pyridine, aminomethyl acrylate, aminomethyl methacrylate, dimethylaminoethyl methacrylate, t-butyl-aminoethyl methacrylate, methacrylamide, vinyl trimethoxysilane, allyl isocyanate, 2-methyl-5-vinyl pyridine, vinyl cyclohexene monoxide, triallyl cyanurate, methacryloxypropyl trimethoxy silane, butylene glycol dimethacrylate, butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, dicyclopentadiene, bis-allyl glycol dicarbonate, triallyl cyanurate, acetyl triallyl citrate, divinylbenzene, diallyl phthalate, terallyl methylene diamine, tetrallyl oxethane, 3-methyl-1,4,6-heptatriene, and the like, as well as oligomers of the foregoing which contain residual ethylenic unsaturation capable of further polymerization such as polybutadiene oligomers, hydroxyl terminated polybutadiene oligomers, partial allylic esters of styrene-maleic anhydride oligomers and the like.

The amount of unsaturated polymerizable material present may be from 2 to 60% by weight of the asbestos, preferably from 10 to 20% by weight. The polymerization may be carried out simply by heating the mixture of filler particles having a cationic surface, the persulfate initiator, and the polymerizable resins and monomers in water dispersion at a moderate temperature, e.g. from 50° to 80° C. for a period of time from a few minutes to a few hours in length.

When polymerization is essentially complete, the polymer coated filler particles may be separated from the dispersion by filtering or other conventional procedure, washed and dried. The resultant dry polymer coated particles may then be dispersed in any desired synthetic polymeric composition in any conventional manner, for example, by melting the composition if it is thermoplastic and mixing them with the molten plastic composition. In some cases they may be dispersed in a monomer which is subsequently polymerized. Among the synthetic polymeric compositions with which the coated filler particles of the present invention may be employed are synthetic rubbers such as styrene-butadiene rubber; ethylenepropylene terpolymer rubber; urethane rubbers; polyalkylenes such as polyethylene, polypropylene, and polyisobutylene, polyacrylonitrile; polybutadiene; copolymers of butadiene and acrylonitrile; copolymers of ethylene with propylene or butene-1 or vinyl acetate or maleic anhydride; polycarbonate resins; phenoxy resins; polyvinyl chloride; copolymers of vinyl chloride with vinyl acetate or other vinyl esters; polyvinyl acetate, linear polyesters; polyvinyl acetals; polyvinylidene chloride; copolymers of vinylidene chloride with vinyl chloride and acrylic acid; poly (methyl methacrylate); superpolyamides; polysulfones; allyl resins such as a polymer of diallyl phthalate; epoxy resins, phenolic resins; silicone resins; polyester resins including alkyd resins; and others. The use of the coated asbestos particles of the present invention in polypropylene compositions is particularly advantageous since the degradation and cracking of the polymer which occurs when uncoated asbestos is used is greatly reduced. In addition, the mixing of the coated asbestos particles with molten plastic compositions is greatly facilitated as compared with the mixing of uncoated asbestos particles with the same compositions.

The following specific examples are intended to illustrate more clearly the nature of the present invention without serving as a limitation upon its scope.

EXAMPLE 1

There was stirred into 4 gallons of tap water 150 grams of Coalinga asbestos, and sufficient barium hydroxide was added with intensive agitation to bring the pH to 10.2, agitation being continued for ten minutes thereafter. The suspension, which was then in flocculated condition, was filtered and washed. The filter cake was redispersed in 4 gallons of water by stirring and sufficient acetic acid was added with continued stirring to bring the pH to 4.2. The resultant dispersion was stable and highly birefringent.

There was introduced into a 3 liter portion of the foregoing suspension 10 grams of a 10% solution of ammonium persulfate in water while maintaining the temperature of the suspension at 75° C. The suspension flocculated during addition of the ammonium persulfate. There were then stirred into the flocculated suspension 20 grams of styrene. A slight temperature increase was observed after the addition of the styrene, and after about 20 minutes mixing, when liberation of heat had ceased, the suspension was filtered, washed with water and dried. The filter cake was extremely voluminous and free draining. It exhibited no detectable odor of styrene but ignited when contacted with a flame. The amount of polystyrene present on the particles, determined by weight loss upon ignition, was approximately 10 to 15% by weight of the asbestos.

A portion of the dried coated fibers prepared as described above was then melt blended into 4 times its weight of polypropylene using a conventional Brabender roller head mixer, at 190° C. The melt blend was cooled, chopped and injection molded into bars. After 24 hours' aging at room temperature, one of these bars was placed in a circulating air oven heated at 140° C. and exhibited no significant deterioration after 24 hours, whereas an identical bar prepared from an equal weight of untreated Coalinga asbestos mixed with 4 times its weight of polypropylene exhibited a marked darkening in color after the same heating time at 140° C. and in addition, the bar could be pulverized by hand after this heating.

Similar results were obtained when there were substituted for the acetic acid either hydrochloric acid or a polymerizable acid such as acrylic acid or methacrylic acid.

EXAMPLE 2

Into 200 parts by weight of styrene monomer were mixed with vigorous agitation 6.5 parts by weight of the coated asbestos fibers described in Example 1. The coated fibers dispersed readily in the styrene forming a thick thixotropic gel. Dark field microscopic examination of this gel at a magnification of 400× showed excellent dispersion of primary asbestos fibrils in the styrene monomer. A portion of this dispersion was mixed with 0.4% by weight of benzoyl peroxide and heated in a form at 60° C. for 16 hours. A transparent fiber-reinforced polystyrene casting was thereby produced.

EXAMPLE 3

The procedure of Example 1 was repeated except that 20 grams of methyl methacrylate was substituted for the 20 grams of styrene with similar results. There was also substituted an equal weight of divinyl benzene for the styrene in the procedure of Example 1 and in another case an equal weight of diethylene glycol diacrylate was substituted for the styrene. In the case of the latter two unsaturated materials, it was found desirable to avoid excessively long polymerization times in order to avoid excessive irreversible agglomeration and bonding of the asbestos particles to each other. Heating for 5 to 10 minutes at 75° C. was found to give satisfactory results and good dispersion in the latter two cases.

EXAMPLE 4

A wollastonite dispersion was prepared as follows: 200 grams of wollastonite, sold under the trade designation, Cab-O-Lite P-1, by Cabot Corporation, were dispersed in one liter of water and the pH was then dropped to 4.0 by the addition of acetic acid. A fluid, soluble dispersion was produced. The slurry was sparged with nitrogen gas to exclude oxygen and the vessel top was sealed, with continued nitrogen sparging. The reaction vessel was then heated to 70° C. To this was then added 2.5 grams of a 10% solution of ammonium persulfate in water, followed by 25 grams of methyl methacrylate monomer. The reaction was carried out with continued good agitation and with total reflux of all volatile gases. After 15 minutes, agitation was stopped, the vessel opened, and the fibrous product recovered by filtration and drying. Gravimetric analysis showed that polymethylmethacrylate coated wollastonite fibers were recovered; these fibers contained about 8 parts polymer per 100 parts dry fiber.

EXAMPLE 5

The procedure of Example 4 is repeated using U.S.P. grade of 325-mesh talc (magnesium silicate) particles, in place of the wollastonite, with essentially the same results and polymer yield.

What is claimed is:

1. The method which comprises mixing a basic filler having an isoelectric point of at least about 8 into water with a monobasic acid to reduce the pH below 5, to form a dispersion containing 0.5 to 50% by weight of cationic filler particles (0.5 to 10% by weight when the filler is chrysotile asbestos), mixing in said aqueous dispersion a water-soluble persulfate initiator of polymerization and a substantially water-insoluble polymerizable material containing at least one polymerizable ethylenic unsaturation and polymerizing to form a particulate product.

2. A process defined in claim 1 wherein said filler is chrysotile asbestos.

3. The method as defined in claim 1 wherein said filler is wollastonite.

4. The method as defined in claim 1 wherein said filler is talc.

5. The method as defined in claim 1 wherein said filler is calcium carbonate.

6. A process as defined in claim 2 wherein said asbestos is dispersed between a pH of from 4 to 5.

7. The method as claimed in claim 1 in which the degree of dispersion is improved by adding water soluble compound of barium to the aqueous chrysotile asbestos dispersion in addition to the monobasic acid used to reduce the pH to between 4 and 5.

8. The method which comprises preparing a particulate asbestos product as claimed in claim 1 and dispersing said product in a mass of organic polymeric material.

9. The method as claimed in claim 8 in which said organic polymeric material is polypropylene.

References Cited

UNITED STATES PATENTS

| 2,040,818 | 5/1936 | Badollet. | |
| 2,751,366 | 6/1956 | Braendle. | |
| 2,855,373 | 10/1958 | Guenther | 260—29.6 |

OTHER REFERENCES

Laddo et al.—Non-metallic Minerals—(McGraw-Hill) (N.Y.) (2nd ed.) (1951)—page 185.

Schildknecht — Polymer Processes — (Interscience) (N.Y.) (1956)—page 196.

MORRIS LIEBMAN, Primary Examiner

H. H. FLETCHER, Assistant Examiner

U.S. Cl. X.R.

106—308; 260—29.6, 34.2, 41.5